United States Patent [19]
Wurm et al.

[11] 3,884,784
[45] May 20, 1975

[54] PROCESS FOR ELECTRO-CHEMICALLY CUTTING AN IRRADIATED NUCLEAR FUEL ASSEMBLY

[75] Inventors: Joseph Gerard Wurm, Mol; Jean Van Impe, Rhode St. Genese; Antoine De Coninck, Groot Bijgaarden; Paul Raymond Heylen, Mol; Jean-Pierre Rombaux, Grimbergen, all of Belgium

[73] Assignees: Centre d'Etude de lEnergie Nucleaire, C.E.N.; E.N.I.-Electrische Nijverheids-Installaties; Belgonuclearie, all of Brussels, Belgium

[22] Filed: July 3, 1972

[21] Appl. No.: 268,800

[30] Foreign Application Priority Data
July 1, 1971 Belgium.......................... 769377

[52] U.S. Cl......................... 204/129.75; 204/22 LM
[51] Int. Cl............................ B23p 1/16; B23p 1/04
[58] Field of Search..................... 204/129.75, 129.8

[56] References Cited
UNITED STATES PATENTS
2,873,233   2/1959   Schnable..................... 204/129.8 X
3,446,713   5/1969   Raviv et al.......................... 204/1.5

OTHER PUBLICATIONS
Electrochemical Machining by DeBarr et al., p. 117, pub. by American Elsevier, New York, 1968.

Primary Examiner—F. C. Edmundson
Attorney, Agent, or Firm—Stevens, Davis, Miller & Mosher

[57] ABSTRACT

This invention relates to a process for electrochemically cutting an irradiated nuclear fuel assembly, in which an electrolyte is arranged between an electrode and the assembly to be cut, and an electric current is conducted between the assembly and the electrode, this process being characterized in that a molten oxidising salt is used as electrolyte, in which a halide is dissolved as auxiliary agent.

4 Claims, 1 Drawing Figure

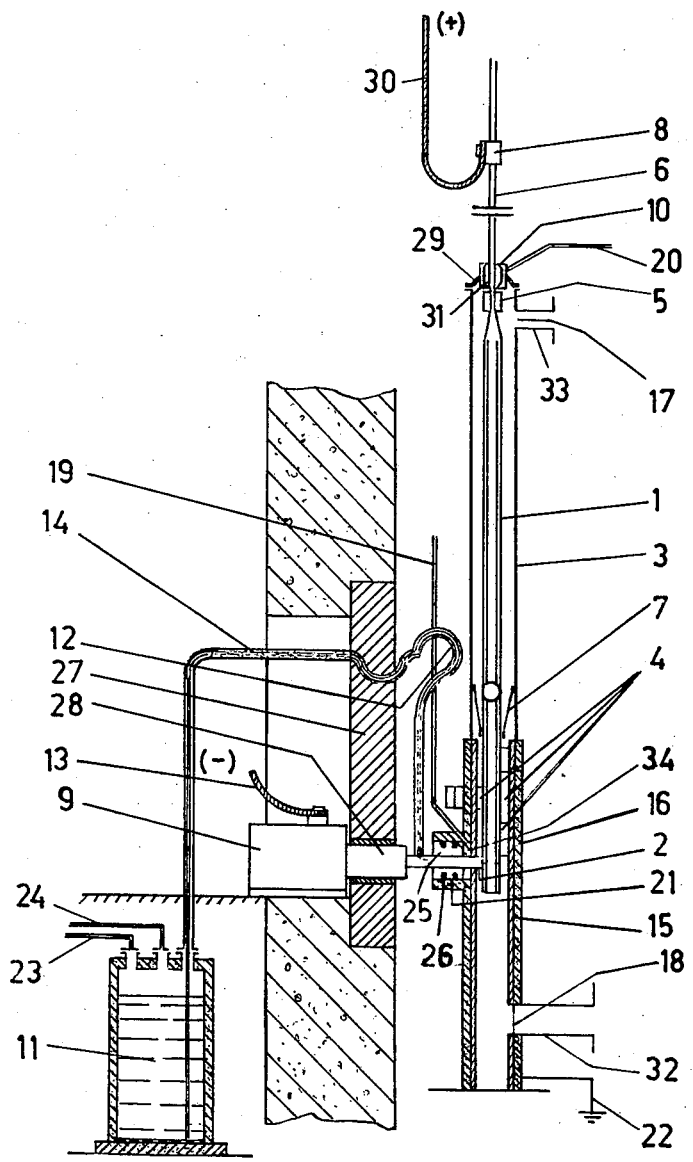

PROCESS FOR ELECTRO-CHEMICALLY CUTTING AN IRRADIATED NUCLEAR FUEL ASSEMBLY

This invention relates to a process for electrochemically cutting an irradiated nuclear fuel assembly, wherein an electrolyte is placed between an electrode and the assembly to be cut and an electric current is conducted between the assembly and the electrode.

After their irradiation in a nuclear reactor, the fuel assemblies are retreated so as to recover the fuel.

This retreatment is generally carried out in several steps the most important of which are, on the one hand, the disengaging of the assembly and the separation of the fuel itself from the casing and the materials of the structural pieces and, on the other hand, the separation of the fissile products of uranium and/or plutonium.

It is obvious that the operations for disengaging the assembly and for separating the casing and the materials of structural pieces of the fuel itself must be consistent with the process which will be used later for separating fissile products of uranium and/or platinum and must preferably already prepare the fuel for the purpose of said separation.

It is known that said condition can be fulfilled by the electrochemical cutting which is particularly known according to Belgian Pat. No. 683,252 of June 28, 1966; according to this patent, an aqueous solution of nitric acid, caustic soda and sodium chloride is used as electrolyte.

This process is satisfactory for electrochemical cutting of assemblies coming from thermal neutron reactors, but is not interesting for cutting assemblies from fast neutron reactors.

As a matter of fact, the fuel which is irradiated in a fast neutron reactor differs from the fuel of thermal neutron reactors, particularly by a generally higher burn-up, a much higher after-heat by volume unit and a higher concentration of fissile material, which results in a criticality problem with aqueous solutions.

Moreover, with regard to the assemblies which are irradiated in a fast neutron reactor which is cooled by a liquid metal, the latter can cause an explosive reaction with the aqueous solution used, when the liquid metal has not been completely eliminated beforehand.

For these reasons, the aqueous solutions are less interesting as electrolytes for cutting assemblies of fast neutron reactors.

Furthermore, the aqueous electrolytes are less suitable for very high current densities, due to the temperature increase of the electrolyte and the formation of steam and bubbles. Now, densities ranging about 1000 $A/cm^2$ are desirable so as to obtain a cutting speed of interest for assemblies of fast neutron reactors.

This invention provides an electrochemical cutting process remedying the drawbacks of known processes.

To this end, according to the invention, a molten oxidising salt is used as electrolyte, wherein a halide is dissolved as auxiliary agent.

It is to be remarked that use as electrolyte of molten oxidising salts without halide-based auxiliary agent does not give wished results due to a passivation phenomen of structural materials.

According to an advantageous embodiment of the invention, molten salt is selected from the group of alkali and alkaline-earth metal nitrates.

In a particular embodiment, $NO_3Na$ is used as molten salt.

The halide may be selected from the group of alkali and alkaline-earth metal halides, said halide being preferably selected between NaF, KF and LiF.

According to a preferred embodiment of the invention, the auxiliary agent has a concentration in the range of 1 to 10 mol % in the molten salt.

Advantageously, one can also use as electrolyte $NO_3Na$ comprising NaF.

Other details and features of the invention will become apparent from the description of several embodiments of a process for electrochemically cutting an irradiated nuclear fuel assembly according to the invention, said description being given hereinafter by way of a non-limitative example and with reference to the annexed drawing.

FIG. is a schematical view of a plant for electrochemical cutting with molten salts.

The plant shown by the FIGURE comprises an enclosure 3 which is closed at its upper part by a cover 29 and open at its bottom. The longitudinal axis of said enclosure is vertical. Into this enclosure, assembly 1 to be chopped is inserted. The cutting will generally be carried out on a whole assembly 1 comprising a needle bundle. The assembly 1 inserted into the enclosure 3 is retained therein through securing shoes 4.

After insertion of the assembly 1, the enclosure is closed with the cover 29. A pipe 6 passes through the cover 29 and bears a hooking means 5 inside the enclosure 3. A cable 30 is connected, on the one hand, through a securing electrode 8 to the pipe 6 and, on the other hand, to a positive terminal of an electric apparatus. Assembly 1 is thus connected to the positive terminal of said electric apparatus through the hooking means 5, the pipe 6, the securing electrode 8 and the cable 30.

The funnel 7, which is adapted to the enclosure 3, ensures the guiding of the assembly 1 during insertion of the latter and the positioning thereof in front of the tool 2. The pipe 6 passes through the cover 29 through a passage element 10 defining a space 31 wherein a external duct 20 opens for entry of a gas. The funnel 7, the securing shoes 4 and the passage element 10 are electrically insulated where they can be in contact either with assembly 1 or with pipe 6. Granite is for example used as insulating material for securing shoes, where a contact with hereinafter mentioned salts is possible. Assembly 1 is thus insulated with respect to the enclosure 3.

A cooling fluid may be admitted through pipe 6 and hooking means 5 into the assembly 1 so as to pass through the latter and to be discharged through the opening 18 provided in the enclosure 3. A duct 32 through which scavenging, reaction and fission gases are recovered is connected to the outlet opening 18.

A cooling gas may also be admitted into the enclosure 3 through a duct 33 which is connected to the inlet opening 17. Cooling of the assembly 1 can thus be ensured either by a fluid admitted through pipe 6 and passing through the assembly 1 or by a cooling gas introduced through duct 33 and circulating around assembly 1. It is to be understood that both cooling embodiments can be used at the same time.

The tool 2 comprises a header which is connected through a pipe 14 to an electrolyte tank 11. Said tank 11 being fixed, a flexible portion 12 is provided for connection of pipe 14 to the header of the tool 2. The tool end enters the enclosure through the wall thereof. The portion of the tool end which is inside the enclosure comprises a row of fine channels through which electrolyte is thrown. Said channels are formed of thin metal tubes which are welded together, each of said tubes being fed by the header which in turn is fed with electrolyte from the tank 11 through pipe 14.

The tool 2 is adapted on the shaft of a feed mechanism 9 of the kind used for electrochemical machining and provided with a servo-system. The enclosure 3 has a hollow external projection 21 wherein a piston 25 with rings 26 is accommodated. The passage of the shaft of the feed mechanism 9 to the enclosure is thus tight.

The cable 13 is connected, on the one hand, to the feed mechanism 9 of the tool and, on the other hand, to the negative terminal of the electric apparatus. The electric current feeding to the tool 2 is thus made through the mechanism 9. The enclosure 3 and the feed mechanism 9 are also earthed in 22 so as to obtain a cathodic protection.

The tool 2 is electrically insulated with a ceramic material.

The transferring of electrolyte stored in the tank 11 to the tool 2 through pipe 14 is obtained by placing tank 11 by means of a duct 23 under a sufficient pressure of neutral gas to obtain the desired output of electrolyte. Duct 24 is used for filling tank 11, which is located at a lower level than tool 2.

The internal surface of the enclosure in the area surrounding the tool 2 is protected against the action of the electrolyte and of the leaking currents by means of a electrorefractory protective layer 15. This layer extends up to above the securing shoes 4 provided above the tool 2.

At the location where the tool 2 passes through the enclosure 3, a space 34 remains free between the external wall of the enclosure 3 and the piston 25. An external duct 19 opens into said space 34. All the portions of the plant, containing electrolyte or susceptible to be in contact with the latter, are provided with a heat-insulating material 16 including incorporated heating means able to bring the temperature thereof above the melting temperature of the electrolyte used.

A biological protection wall 27, for example of heavy concrete or partly of lead, is arranged between the enclosure 3 with tool 2, on the one hand, and the feed mechanism 9, the electrolyte tank 11 and the servo-system, on the other hand. The passage 28 of the shaft of the feed mechanism 9 through the biological protection wall 27 is gas-tight.

It is to be understood that the feeding pipe 14 passes also tightly through said biological protection wall 27.

For cutting the assembly 1 by means of the plant such as hereinabove described, the tool 2 is moved under the influence of the mechanism 9 across the assembly 1. The tool 2 thus moves in a direction which is substantially perpendicular to the longitudinal axis of the enclosure 3, which coincides with the longitudinal axis of the assembly 1. The tool 2 has thus a horizontal movement, while the assembly 1 has generally a vertical direction.

Pieces cut from the assembly 1 and the electrolyte are recovered from the bottom of the enclosure 3.

The gas fed by duct 33 acts to cool the assembly 1 but also to ensure a restraining and a discharge of the electrolyte and solid particles at the level of the cutting. The same purpose is obtained at the level of the passage of the tool 2 to the enclosure 3 and at the level of the passage 10 by means of the scavenging gas fed by ducts 19 and 20.

The assembly can also be provided with a filling alloy. In said case, there is no cooling by means of pipe 6. When a cooling is used through this pipe 6, obturation of the assembly 1 by the tool 2 is prevented at the end of the cutting, by carrying out two successive cuttings at the same level on the half portion of the cross-section of assembly 1 while rotating the latter by 180° about its longitudinal axis between the two cultings, by means of the hooking means 5 and the pipe 6.

The width of the tool is slightly larger than that of the assembly 1.

The plant hereinabove described is well adapted to the process using as electrolyte a molten oxidising salt or a mixture of such salts, wherein at least one halide is dissolved as auxiliary agent.

The molten salt with its auxiliary agent has a double function. On the one hand, it acts as electrolyte, i.e. it takes a part in the dissolution of the casing material and, on the other hand, it is useful for the complete desintegration of the fuel.

The electrolyte, i.e. the molten oxidising salt wherein the halide is dissolved must be selected so that it allows a high speed cutting and a suitable desintegration of the fuel.

In order that said conditions are met, the melting point of the electrolyte must be the lowest possible; the electrolyte must promote a maximum rate of anodic dissolution, it must preferably have a good thermal, chemical and radiochemical stability, it must in some cases be compatible with the presence of liquid metal, it must allow the desintegration and the pulverization of the fuel, it must be compatible with the continuation of the retreatment, for example with an aqueous retreatment step, and it must be compatible with the construction materials of the machine carrying out the electrocutting.

In order that all said conditions are met, the electrolyte must be comprised of at least two main constituents: at least one starting oxidising salt and at least one auxiliary agent.

The starting oxidising salt is selected from the group comprising stable alkali or alkaline-earth metal nitrates. It is comprised for example of $NO_3Na$, $NO_3K$, $NO_3Li$ or of a binary salt such as $NO_3Na - NO_3K - NO_3Li$ or $NO_3Na - NO_3Li$ or of a ternary entectic such as $NO_3Na - NO_3K - NO_3Li$ or still of a mixture of said salts.

Said ternary entectic has for example the advantage to melt at a very low temperature, of about 120°C, so that the electrocutting operations and the following operations, for example transferring and filtration, can be simplified.

The auxiliary salt must obviously be soluble in the starting salt. The auxiliary salt is a halide which is soluble in the starting salt, or in a mixture of such halides. The auxiliary salt is preferably selected from the group of alkali or alkaline-earth metal halides and thus comprises one or more alkali or alkaline-earth metal chlorides and/or fluorides and/or bromides and/or iodides.

The selection of the auxiliary salt is not only a function of the nature of the starting salt but also of the nature of the materials of structural pieces, thus of the assembly housing, of the nature of the casing and of the fuel, and also of the further contemplated treatment.

EXAMPLE 1

The fuel casing and the assembly housing are made of stainless steel and the electrolyte is molten $NO_3Na$ wherein NaF in a concentration of 5 mol % is dissolved. This concentration may be higher or lower but is preferably maintained between 5 and 10 mol %. The temperature of the electrolyte is maintained between 400 and 500°C but is preferably of 450°C. The output of the electrolyte is brought to 300–500 cc/sec. The working gap in normal functioning, i.e. the distance between the end of the tool 2 and the assembly 1 is maintained between 70 microns and 0.2 mm. The voltage between electrodes, namely between tool 2 and assembly 1, is between 10 and 25 volts, the average current density is 1000 A/cm² and the molten salt pressure at the outlet of the tool 2 is limited to 25 kg/cm². By calculation, one obtains under said conditions a cutting speed of about 2 to 3 cm/minute, at the same time as a desintegration of the fuel itself, even in the case when the fuel is a mixture of $UO_2$ and $PuO_2$, the percentage of $PuO_2$ being allowed to substantially exceed 20% by weight.

The part played by NaF is explained as follows. The sodium fluoride(NaF) gives free fluorine by electrochemical decomposition:

$$2\ NaF \rightleftarrows 2\ Na^+ + 2\ F^-$$

$$2\ F^- \rightleftarrows Fe_2 + 2e^-$$

The free fluorine anodically attacks the stainless steel and particularly the nickel:

$$Ni + Fe_2 \rightleftarrows NiF_2$$

The molten oxidising salt oxidises the sodium with formation of $Na_2O$. The sodium fluoride reforms in the bath by reaction of the formed fluoride with $Na_2O$ deriving from the influence of the molten oxidising salt, which can be represented by the equation:

$$NiF_2 + Na_2O \rightleftarrows 2NaF + NiO$$

What is explained hereinbefore for Ni and NaF is valid nutadis mutandis for other metals and other auxiliary agents.

The whole develops as if the metal to be dissolved, for example nickel, was oxidised at the anode but with the difference that said oxidisation reaction is made through metallic fluoride. So the metallic oxide formed, for example NiO, does not adhere to the anode to form an insulating layer, and the electrolytic dissolution can continue indefinitely.

As a matter of fact, the sodium fluoride which takes part in the reaction continuously reforms and its composition in the bath thus does not vary. The oxides of the metal to be dissolved do not adhere to the metal surface and are continuously taken away with the salt stream as fine particles in suspension.

EXAMPLE 2

The fuel casing and the assembly housing are made of zirconium alloy. The concentration of NaF is of 1 mol %. This concentration can be higher or lower, but is preferably maintained between 1 and 2 mol %. The other values and the results calculated are of the same order as those of Example 1.

OTHER EXAMPLES $NO_3Na$ can be replaced by either of the following salts: $NO_3K$, $NO_3Li$, $NO_3Na - NO_3K$, $NO_3K - NO_3Li$, $NO_3Na - NO_3Li$, $NO_3Na - NO_3K - NO_3Li$.

One of the advantages of the use of the ternary entectic is that the latter melts at a very low temperature, so that the electrocutting operations and the following operations can be simplified.

NaF can be replaced by KF, NaCl, KCl or any of other alkali or alkaline-earth metal chlorides, fluorides, bromides and iodides.

In addition to the advantages mentioned and to those deriving from the preceding description, it is to be remarked that the use of molten salts allows to confine some fission gases, such as tritium and iodine, without substantial dilution.

It is to be understood that the invention is not limited to the embodiments described but that changes can be brought therein without departing from the scope of the invention.

Thus for example the assembly involved can be formed by only one needle or by a needle bundle without housing, and the fuel casing and/or the assembly housing can be made of other metal materials, such as for example ferritic steels or nickel alloys.

Also, the term "cutting" must be understood in a broad sense and also relates to chopping or any other splitting means.

We claim:

1. A process for electrochemically cutting an irradiated fuel assembly comprising the steps of:
    connecting the assembly as an anode into an electric circuit,
    connecting a tool with a row of channels as a cathode into the electric circuit,
    and throwing an electrolyte through the channels against the assembly,
    the electrolyte consisting in a molten salt comprising an alkali nitrate, in which a fluoride selected from the group comprising NaF, KF and LiF is dissolved in a concentration of 1–10 mol %.

2. The process as claimed in claim 1, wherein the alkali nitrate is $NaNO_3$.

3. The process as claimed in claim 1, wherein the electrolyte consists in a molten ternary eutectic:
    $NaNO_3 - KNO_3 - LiNO_3$, in which a fluoride selected from the group comprising NaF, KF and LiF is dissolved in a concentration of 1–10 mol %.

4. The process as claimed in claim 1, wherein the electrolyte is molten $NaNO_3$ in which NaF is dissolved in a concentration of 1–5 mol %.

* * * * *